UNITED STATES PATENT OFFICE.

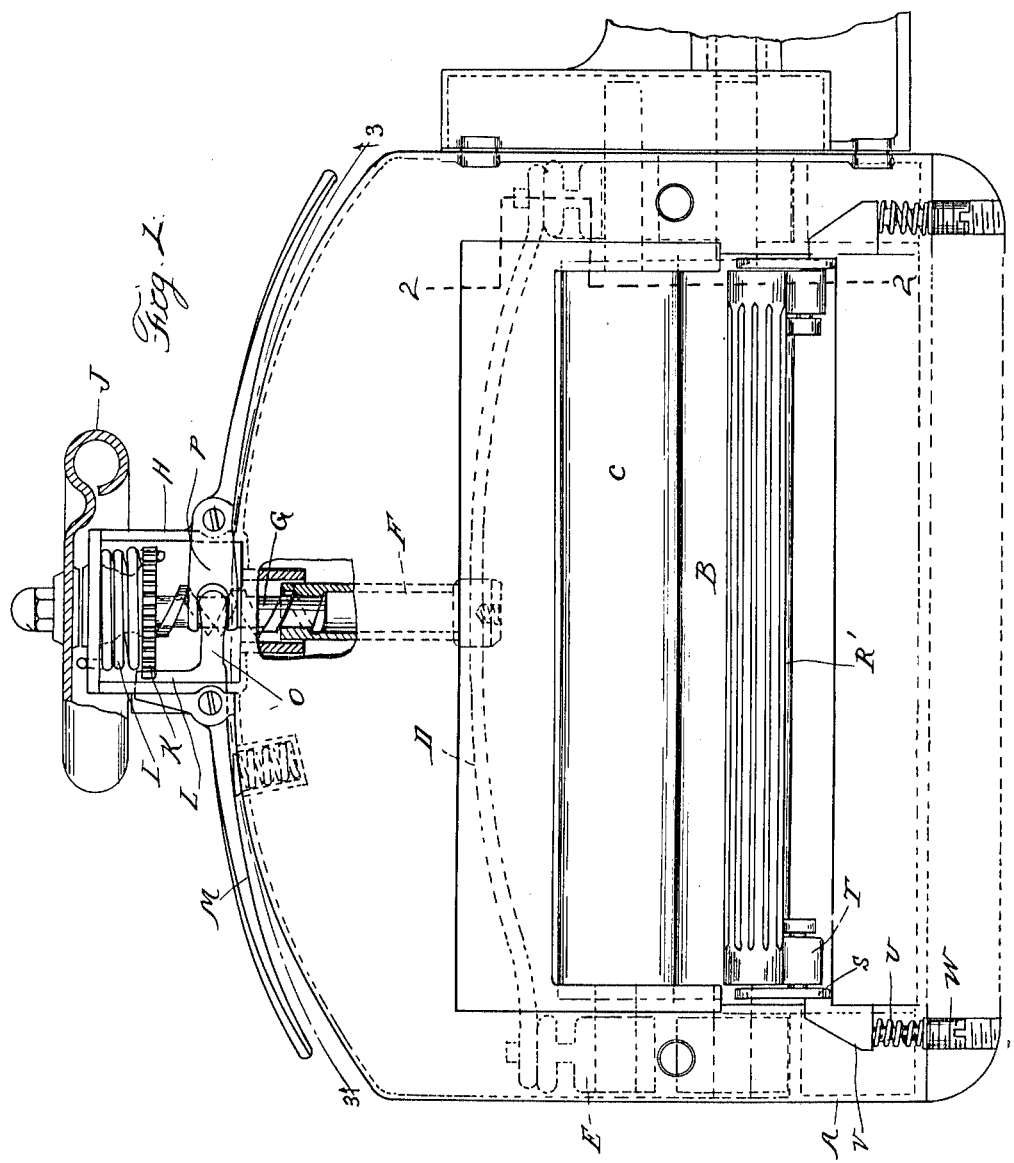

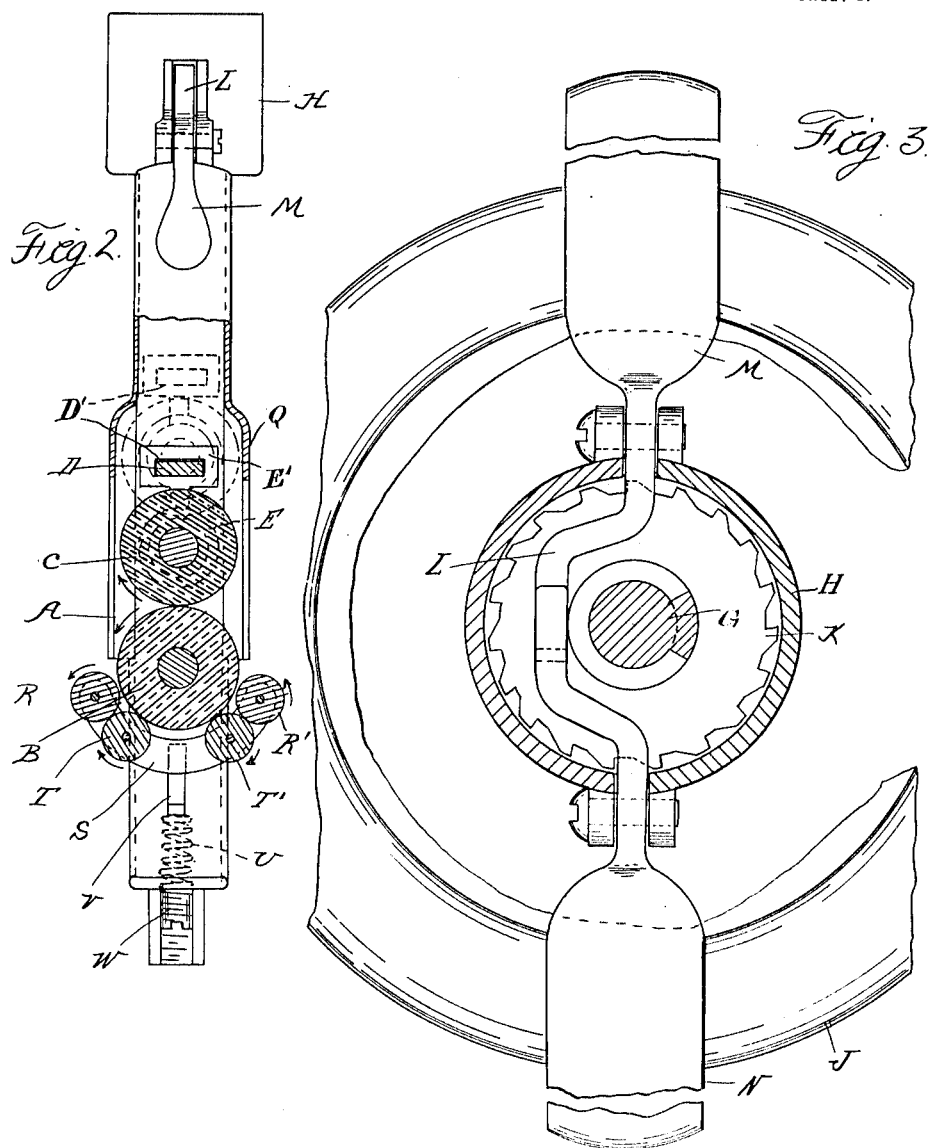

EDGAR D. MISNER, OF DETROIT, MICHIGAN.

WRINGER.

1,409,752.  Specification of Letters Patent.  Patented Mar. 14, 1922.

Application filed September 27, 1920. Serial No. 412,913.

*To all whom it may concern:*

Be it known that I, EDGAR D. MISNER, a citizen of the United States of America, residing at Detroit, in the county of Wayne and State of Michigan, have invented certain new and useful Improvements in Wringers, of which the following is a specification, reference being had therein to the accompanying drawings.

The invention relates to wringers designed to be power driven, and it is the primary object of the invention to provide a safety attachment by which the pressure of the rolls can be instantly released and the rolls themselves separated. It is a further object to provide means for preventing the winding of a garment about the rolls. With these and other objects in view the invention comprises the novel construction as hereinafter set forth.

In the drawings:

Figure 1 is a side elevation of the wringer, with parts broken away;

Figure 2 is an end elevation thereof, partly in section on line 2—2 of Figure 1;

Figure 3 is a section on line 3—3 of Figure 1.

My improved construction of wringer comprises a suitable frame A having journaled therein the driven roller B, which may be connected by any suitable transmission (not shown) to the source of power. C is the pressure roller, and D is the spring which supplies the resilient pressure.

It is usual to journal the roller C in bearings slidable in the frame and against which the spring is pressed; also, to vary the tension of the spring by a central screw bearing thereon. With my improved construction the spring is also tensioned by a central screw, but this is of such a construction and is associated with such additional parts that the pressure may be instantaneously released. Also, in place of merely pressing the roll towards the companion roll, the spring D in my construction is adapted to retract the roll C, so as to widely separate the same from the roll D.

To accomplish the result just described, the spring D at the opposite ends thereof is engaged with bearings E for the roll C in such a manner as to actuate said bearings in opposite directions. In detail, the ends of the spring D engage in openings D′ in the upwardly extending projections E′ of the bearings. At the center of the spring D there is arranged an internally-threaded socket member F and the pitch of the threads is such as to be without the angle of friction so as to constitute a reversible transmission. G is a cooperating externally-threaded member, which has a swivel bearing in a housing H at the top of the frame, and I is a motor, preferably a torsional spring within the housing H, for rotating the member G in one direction. J is an actuating handle outside of the housing for rotating the member G in the opposite direction so as to tension the spring I at the same time that the socket member F is moved in a direction to apply pressure to the spring D. K is a notched wheel secured to the member G within the housing H and L is a catch or detent for engaging the notches of the wheel K to lock the member G from rotary movement. The detent L is secured to a trip lever M, which is arranged to extend across the top of the frame of the wringer on one side of the center thereof, while a corresponding lever N on the opposite side of the frame is coupled to the lever M by inter-engaging fingers O and P on the respective levers. The arrangement is such that a slight pressure on either of the levers M or N and at any point in the extent thereof will withdraw the detent L from the notched wheel K, permitting the spring I to revolve the member G and thereby to retract the socket member F, drawing with it the spring D, bearings E and roll C. Thus in case the operator should catch a hand between the rolls, he can instantaneously not only release the pressure of the roll, but actually separate them so as to avoid all possibility of injury. Furthermore, due to the fact that the screw is of a pitch outside the angle of friction, any article caught between the rolls which cannot pass through the same, will tend to cause the rotation of the member G in addition to the action of the spring thereon. It is therefore only necessary to have a spring of sufficient tension to continue the rotation, the initial movement of which is accomplished by the outward pressure on the rolls.

To permit of the retraction of the roll C, the upper part of the frame A is hollow, providing a recess of sufficient size to completely receive the roll. As shown, this recess is formed in a laterally enlarged portion Q of the frame.

A common defect in wringers is the tendency to wind a garment spirally about the lower roll. This I have avoided by arrangement of one or more driven rolls adjacent to but out of contact with said lower roll and turning in the same direction. As shown, R and R' are fluted rolls arranged adjacent to the roll B and journaled in the segmental frame S at opposite sides of the frame A. The rolls R and R' are out of frictional contact with the roll B, but are in frictional contact with short rolls T and T', which are also in frictional contact with the roll B. These rolls T and T' are also journaled in the segmental frames S and the arrangement is such that motion is transmitted frictionally from the roll B through the rolls T and T' to the rolls R and R', with the result that all of the rolls R, B and R' are rotated in the same direction. Thus a garment entering the wringer is assisted by the fluted roll on that side, while the garment leaving the wringer, if it adheres to the lower roll, will upon contacting with the fluted roll R or R' be stripped from the roll B and guided outward. The frames S are slidably engaged with the frame A and are placed under resilient pressure by means of the springs U, bearing against depending lugs V on said segmental frames and abutting against a screw plug W in a threaded recess in the frame A.

With the construction described it will be appreciated that injury either to the operator or to the garments operated upon is prevented.

What I claim as my invention is:

1. In a wringer, the combination with a pair of rolls, of bearings for one roll movable towards or from the other roll, a yieldable resilient member connected to said movable bearings to actuate the same towards or from said other roll, means engaging said resilient member for tensioning the same to press the rolls into contact, automatic means for retracting said tensioning means to release the pressure and to separate the rolls from each other, and a trip controlling the action of said automatic means.

2. In a wringer, the combination with a pair of rolls, bearings for one roll movable towards or from the companion roll, a resilient bowed member engaged with said bearings to move the same towards or from said companion roll, a member engaged with the center of the bow movable to tension the same and press the rolls into contact, means for storing power to automatically actuate said member in the opposite direction to release the tension and to separate the rolls from each other, and a trip for releasing said stored power.

3. In a wringer, the combination with a pair of rolls, of means for moving one of said rolls towards and from the other, including a movable member, and a resilient member between the same and the roll actuated thereby, means for storing power upon the actuation of said movable member in a direction to tension said resilient member and to press said rolls into contact, the power stored being sufficient to retract said movable member and separate said rolls, and a trip for releasing the stored power.

4. In a wringer, the combination with a pair of rolls, of means for moving one of said rolls towards and from the other, including an adjustable screw and a resilient member tensioned thereby to press said rolls into contact, means operated by the rotation of said screw to tension said resilient member for storing power for the rotation of said screw in the opposite direction, a catch for holding said screw from rotation under the actuation of said stored power, and means for tripping said catch.

5. In a wringer, the combination with a pair of rolls, of means for separating and contacting said rolls, including a pair of screw threadedly engaging members, and a resilient member between one of said threaded members and the roll, means for rotating the other of said threaded members to force the rolls into contact and to place said resilient member under tension, means for storing power by said rotation of the threaded member, a catch for retaining the stored power, and a trip for releasing said catch to permit the reverse rotation of said screw and the retraction of the roll.

6. In a wringer, the combination with a frame and a pair of rolls journaled therein, of bearings in which one of said rolls is journaled movable in said frame for the retraction of said roll from its cooperating roll, a resilient bowed member connected to said bearings, a central member secured to said bowed member and threadedly engaging a cooperating member, means for rotating the cooperating member to press the roll in contact with its cooperating roll and to tension said bowed member, means for storing power by the rotation of said member, a pawl and ratchet permitting said rotation but preventing reverse rotation, and a trip for releasing said pawl to permit the stored power to reversely rotate said member, relieving the tension of said resilient member and retracting the roll.

7. In a wringer, the combination with a frame and a pair of rolls journaled therein, bearings in which one of said rolls is journaled, movable in said frame towards or from the cooperating roll, a resilient bowed member connected to said bearings, a member connected to the center of said bowed member and a cooperating member having a threaded engagement therewith, the pitch of said threads being slightly without the angle of friction, means for storing power upon the relative rotation of said threaded members in a direction to press the rolls in contact and to tension said bowed member, a catch for retaining the stored power, and a trip for releasing said catch.

8. In a wringer, the combination with a frame, of a pair of rolls journaled therein, bearings for one of said rolls movable in said frame towards or from the cooperating roll, a recess in the frame into which said movable roll may be retracted and widely separated from its companion roll, a resilient bowed member connected to said bearings, a threaded member connected to the center of said bowed member, and a cooperating member having a threaded engagement therewith, the pitch of the thread being slightly without the angle of friction, a torsional spring having one end fixed and the other connected with one of said threaded members and tensioned by the rotation of the same in a direction to force said rolls towards each other and to tension said bowed member, an actuating handle for rotating said last named threaded member, a catch for holding said threaded member from reverse rotation, and a trip for releasing said catch, whereupon the resilient pressure of said torsional spring in conjunction with the outward pressure on said roll will reverse the rotation of said threaded member and separate said rolls from each other.

9. In a wringer, the combination with a frame, of a pair of rolls journaled therein, and means for moving one of said rolls towards or from the other, including a pair of threadedly engaged members, an actuating handle for rotating one of said members in relation to the other, a torsional spring tensioned by the rotation of said member, a catch for holding said member from reverse rotation, and a trip for releasing said catch extending along the top of said frame.

10. In a wringer, the combination with a frame, of a pair of rolls journaled therein, means for moving one of said rolls towards or from the other, including a pair of threadedly engaged members centrally arranged with respect to the rolls, a rotating handle for actuating one of said members in relation to the other, a torsional spring tensioned by the rotation of said member in a direction to force said rolls towards each other, a catch for holding said member from reverse rotation, a lever for releasing said catch extending along the top of the frame on one side of the center thereof, and a second lever similarly extending on the opposite side of the top of the frame and connected to said first-mentioned lever to actuate the same.

11. In a wringer, the combination with a pair of rolls, and means for resiliently pressing said rolls into contact and separating the same, of means for actuating said first-mentioned means to release the pressure and separate said rolls from each other, and a trip for releasing said last-mentioned means.

12. In a wringer, the combination with a pair of rolls, of a common means for moving one of said rolls toward and away from the other roll, means for automatically actuating said common means to separate said rolls from each other, and a trip for releasing said automatic separating means.

13. In a wringer, the combination with a frame, of a pair of rolls journaled therein, means for yieldably pressing said rolls into contact, means for automatically separating the rolls from each other, a catch for controlling said automatic separating means, and levers extending along the top of said frame for actuating said catch.

In testimony whereof I affix my signature.

EDGAR D. MISNER.